US011505261B2

(12) United States Patent  
Van Norman et al.

(10) Patent No.: US 11,505,261 B2  
(45) Date of Patent: Nov. 22, 2022

(54) VEHICLE HINGE ASSEMBLY

(71) Applicants: Paul S Van Norman, Fenton, MI (US); Michael C Gillam, Oxford, MI (US); Sean E Whelan, Highland, MI (US); Clifford L Eberle, Jr., Clarkston, MI (US); Randy K Ihrke, Auburn Hills, MI (US); Eric Ghoukasian, Auburn Hills, MI (US); Vivek V Kirtane, Troy, MI (US); Christopher J Duke, White Lake, MI (US)

(72) Inventors: Paul S Van Norman, Fenton, MI (US); Michael C Gillam, Oxford, MI (US); Sean E Whelan, Highland, MI (US); Clifford L Eberle, Jr., Clarkston, MI (US); Randy K Ihrke, Auburn Hills, MI (US); Eric Ghoukasian, Auburn Hills, MI (US); Vivek V Kirtane, Troy, MI (US); Christopher J Duke, White Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 121 days.

(21) Appl. No.: 17/158,188

(22) Filed: Jan. 26, 2021

(65) Prior Publication Data

US 2021/0245818 A1 Aug. 12, 2021

Related U.S. Application Data

(60) Provisional application No. 62/971,374, filed on Feb. 7, 2020.

(51) Int. Cl.  
*B62D 33/027* (2006.01)

(52) U.S. Cl.  
CPC .................. *B62D 33/0273* (2013.01)

(58) Field of Classification Search  
CPC ...... B62D 33/0273; E05D 15/52; B60J 5/102; B60J 5/105; B60J 5/108  
(Continued)

(56) References Cited

U.S. PATENT DOCUMENTS 5,685,594 A * 11/1997 Harper ............... B62D 33/0273  
296/57.1  
6,742,826 B2 * 6/2004 Humphrey ......... B62D 33/0273  
296/57.1  
(Continued)

FOREIGN PATENT DOCUMENTS

CA 2418606 A1 8/2004

*Primary Examiner* — Gregory A Blankenship  
(74) *Attorney, Agent, or Firm* — Ralph E Smith

(57) ABSTRACT

A vehicle includes a vehicle body, a door and a hinge assembly. The door is coupled to the vehicle body and is pivotable about a horizontal axis between a closed position and a horizontal open position. The door is also pivotable about a vertical axis between the closed position and a vertical open position. The hinge assembly pivotably couples the door to the vehicle body and includes a first hinge and a second hinge. The first hinge includes a first hinge plate and at least one first hinge barrel extending from the first hinge plate. The second hinge includes a second hinge plate, an extension section and at least one second hinge barrel. The extension section positions the vertical axis laterally outwardly relative to a mounting location of the hinge assembly to the vehicle body. The vertical axis also being positioned inwardly relative to the door.

12 Claims, 10 Drawing Sheets

(58) Field of Classification Search
USPC .................................................. 296/51, 57.1
See application file for complete search history.

(56) References Cited

U.S. PATENT DOCUMENTS

| | | | |
|---|---|---|---|
| 6,938,941 B2 | 9/2005 | Thiele et al. | |
| 7,547,056 B2* | 6/2009 | Waldner | E05D 15/52 |
| | | | 292/DIG. 42 |
| 7,669,908 B2* | 3/2010 | Townson | E05D 3/10 |
| | | | 49/192 |
| 8,061,753 B2* | 11/2011 | Papanikolaou | B62D 33/0273 |
| | | | 296/146.12 |
| 8,136,862 B2 | 3/2012 | Bator et al. | |
| 8,246,098 B2* | 8/2012 | Cheung | B62D 33/0273 |
| | | | 296/146.12 |
| 8,740,279 B1 | 6/2014 | McGoff et al. | |
| 10,731,393 B2* | 8/2020 | Ihrke | B60J 5/108 |
| 11,014,512 B2* | 5/2021 | Ledwith | B60J 5/10 |
| 11,155,310 B2* | 10/2021 | Rhodes | B60J 5/108 |
| 2009/0250959 A1* | 10/2009 | Townson | E05D 15/52 |
| | | | 296/51 |
| 2012/0324793 A1* | 12/2012 | Abbasi | B62D 33/0273 |
| | | | 49/168 |
| 2021/0245818 A1* | 8/2021 | Van Norman | B62D 33/0273 |

\* cited by examiner

VEHICLE HINGE ASSEMBLY

CROSS-REFERENCE TO RELATED APPLICATION

This application claims the benefit of U.S. Provisional Application No. 62/971,374, filed on Feb. 7, 2020. The entire disclosure of the above application is incorporated herein by reference.

FIELD

The present disclosure relates to a vehicle hinge assembly.

BACKGROUND

This section provides background information related to the present disclosure and is not necessarily prior art.

A pickup truck disclosed in U.S. Pat. No. 8,740,279, which issued Jun. 3, 2014 and is incorporated herein by reference in its entirety, includes a multi-functional tailgate spanning a width of the aft end of the cargo bed. The multi-functional tailgate is pivotably coupled to the cargo bed so that the multi-functional tailgate is allowed to pivot about a horizontal axis between a horizontal open position and a closed position. The multi-functional tailgate also includes two doors that can be latched together so as to pivot together between the horizontal open position and the closed position, or unlatched so as to pivot independently of each other between the horizontal open position and the closed position. When the two doors are unlatched from each other, each door can rotate independently about the horizontal axis (i.e., between the horizontal open position and the closed position) and about a vertical axis (i.e., between a vertical open position and the closed position).

SUMMARY

This section provides a general summary of the disclosure, and is not a comprehensive disclosure of its full scope or all of its features.

The teachings of the present disclosure provide a hinge assembly that allows for each door to be rotated about the vertical axis while concealing the hinge assembly from view outside of the vehicle.

In one form, the present disclosures provides a vehicle that includes a vehicle body, a door and a hinge assembly. The door is coupled to the vehicle body and is pivotable about a horizontal axis between a closed position and a horizontal open position. The door is also pivotable about a vertical axis between the closed position and a vertical open position. The hinge assembly is pivotably coupling the door to the vehicle body and includes a first hinge, a second hinge and a pivot pin. The first hinge includes a first hinge plate and at least one first hinge barrel extending from the first hinge plate. The second hinge includes a second hinge plate, an extension section and at least one second hinge barrel extending from the extension section. The pivot pin defines the vertical axis and extends at least partially through the at least one first hinge barrel and the at least one second hinge barrel. The extension section positions the vertical axis laterally outwardly relative to a mounting location of the hinge assembly and the vehicle body. The vertical axis also being positioned inwardly relative to the door.

In some configurations of the vehicle of the above paragraph, the extension section includes a plate portion, an intermediate portion and a hinge-barrel portion. The plate portion extends at an angle from the second hinge plate to the intermediate portion and the hinge-barrel portion extends at an angle from the intermediate portion to the hinge-barrel portion.

In some configurations of the vehicle of any one or more of the above paragraphs, the extension section includes a stop surface. The first hinge is configured to contact the stop surface when the door is in the vertical open position to prevent further opening of the door.

In some configurations of the vehicle of any one or more of the above paragraphs, the extension section includes a plate portion, an intermediate portion and a hinge-barrel portion. The plate portion extends laterally outwardly and rearwardly from the second hinge plate and the hinge-barrel portion extends laterally outwardly and rearwardly from the intermediate portion.

In some configurations of the vehicle of any one or more of the above paragraphs, the extension section positions the vertical axis adjacent to an outer corner edge of the door.

In some configurations of the vehicle of any one or more of the above paragraphs, a frame is coupled to the vehicle body. The second hinge plate is coupled to the frame.

In some configurations of the vehicle of any one or more of the above paragraphs, the at least one first hinge barrel includes a tab extending therefrom and the extension section includes a stop surface. The tab is configured to contact the stop surface when the door is in the vertical open position to prevent further opening of the door.

In some configurations of the vehicle of any one or more of the above paragraphs, an outer corner edge of the door is chamfered and an outer corner edge of the vehicle body opposing the door is chamfered.

In some configurations of the vehicle of any one or more of the above paragraphs, the at least one first hinge barrel and the at least one second hinge barrel is positioned adjacent the outer corner edge of the door.

In some configurations of the vehicle of any one or more of the above paragraphs, a gap exists between the outer corner edge of the vehicle body and the outer corner edge of the door. The gap is equal to or less than 5 mm.

In some configurations of the vehicle of any one or more of the above paragraphs, a frame coupled to the vehicle body, and wherein the first hinge is coupled to the door and the second hinge is coupled to a vertical section of the frame at a middle portion of the vertical section.

In some configurations of the vehicle of any one or more of the above paragraphs, the extension section at least partially wraps around the frame.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
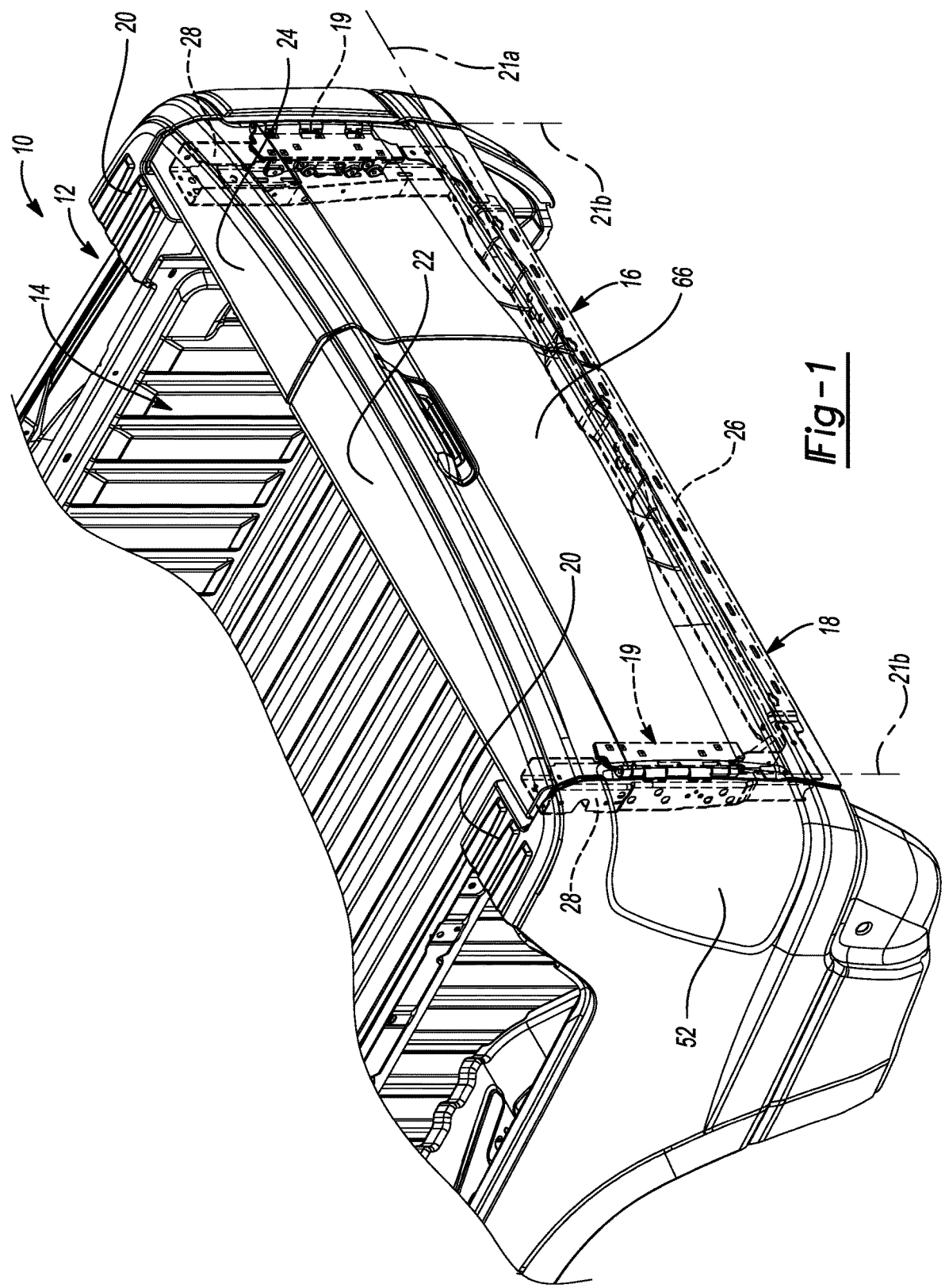
FIG. 1 is a partial perspective view of a vehicle having a cargo bed and a multi-functional tailgate according to the principles of the present disclosure.
Figure 2:
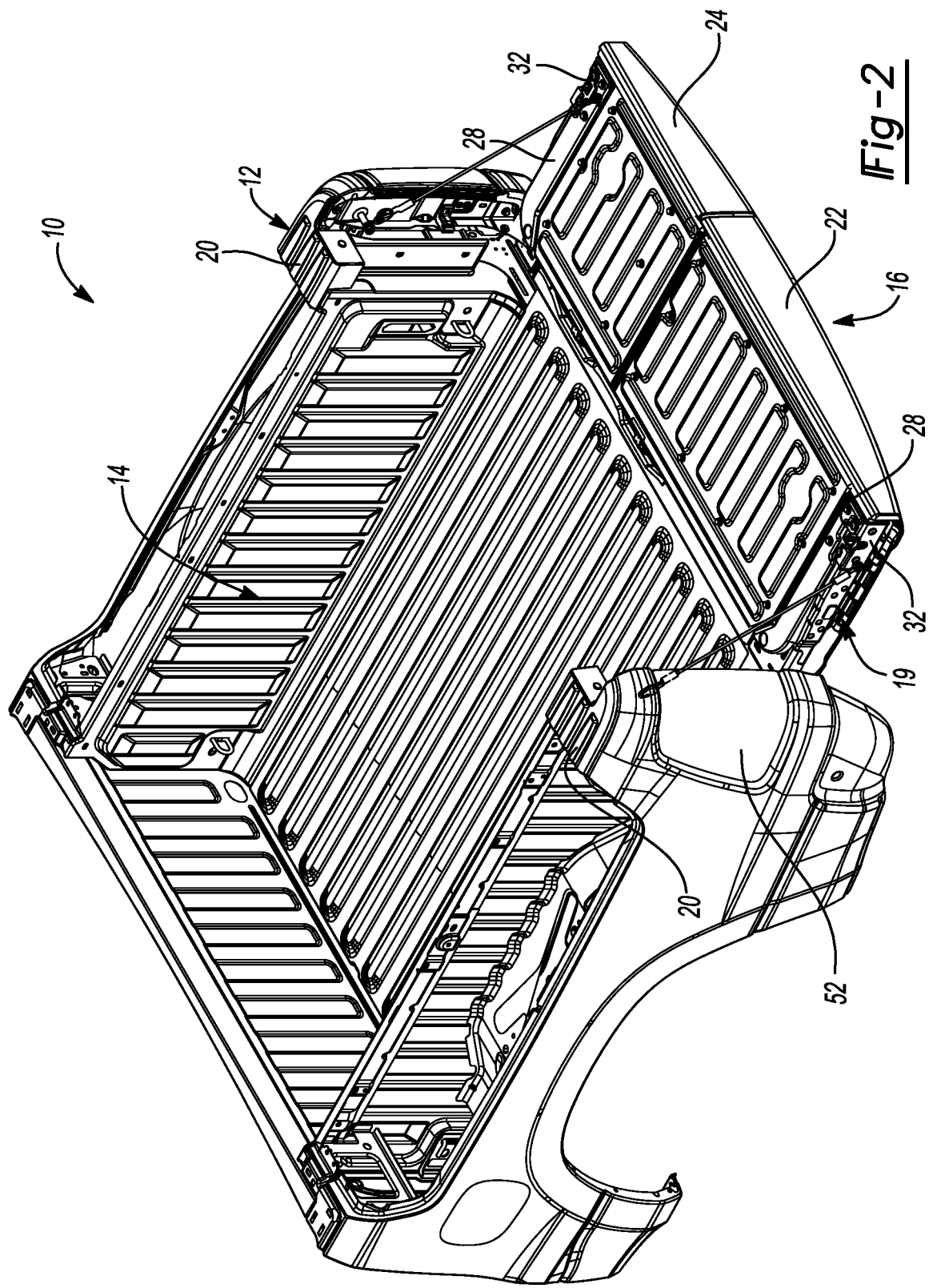
FIG. 2 is a perspective view of the cargo bed of FIG. 1 with the multi-functional tailgate in a horizontal open position.
Figure 3:
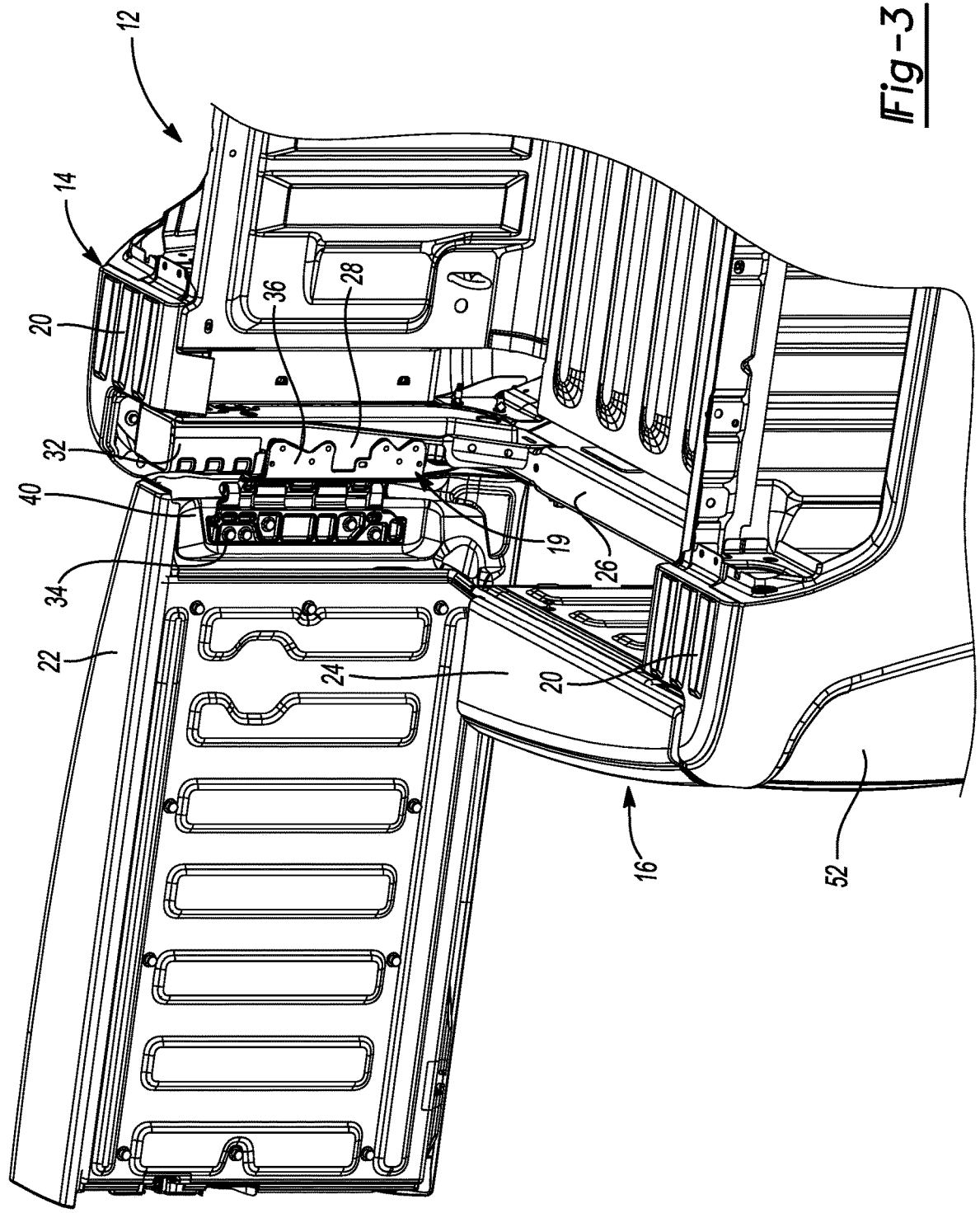
FIG. 3 is a partial perspective view of the cargo bed of FIG. 1 with a door of the multi-functional tailgate in a vertical open position.

With reference to FIGS. 1 and 2, a vehicle 10 is provided. The vehicle 10 can be similar or the same as the vehicle disclosed in Applicant's commonly owned U.S. Pat. No. 8,740,279, the disclosure of which is incorporated herein by reference. The vehicle 10 include a vehicle body 12. The vehicle body 12 includes a cab (not shown), a cargo bed 14, a multi-functional tailgate 16, a frame 18 and a pair of hinge assemblies 19. The cargo bed 14 is attached to an aft end of the cab and includes sidewalls 20 extending between fore and aft ends of the cargo bed 14.

The multi-functional tailgate 16 spans across the aft end of the cargo bed 14 and is pivotably coupled thereto. The tailgate 16 is pivotable about a horizontal axis 21a between a closed position and a horizontal open position. The multi-functional tailgate 16 includes left and right doors 22, 24. Each door is independently pivotable between the closed position and a vertical open position about respective vertical axes 21b. In some configurations, each door 22, 24 of the tailgate 16 is independently pivotable between the closed position and the horizontal open position about the horizontal axis 21a.

Figure 4:
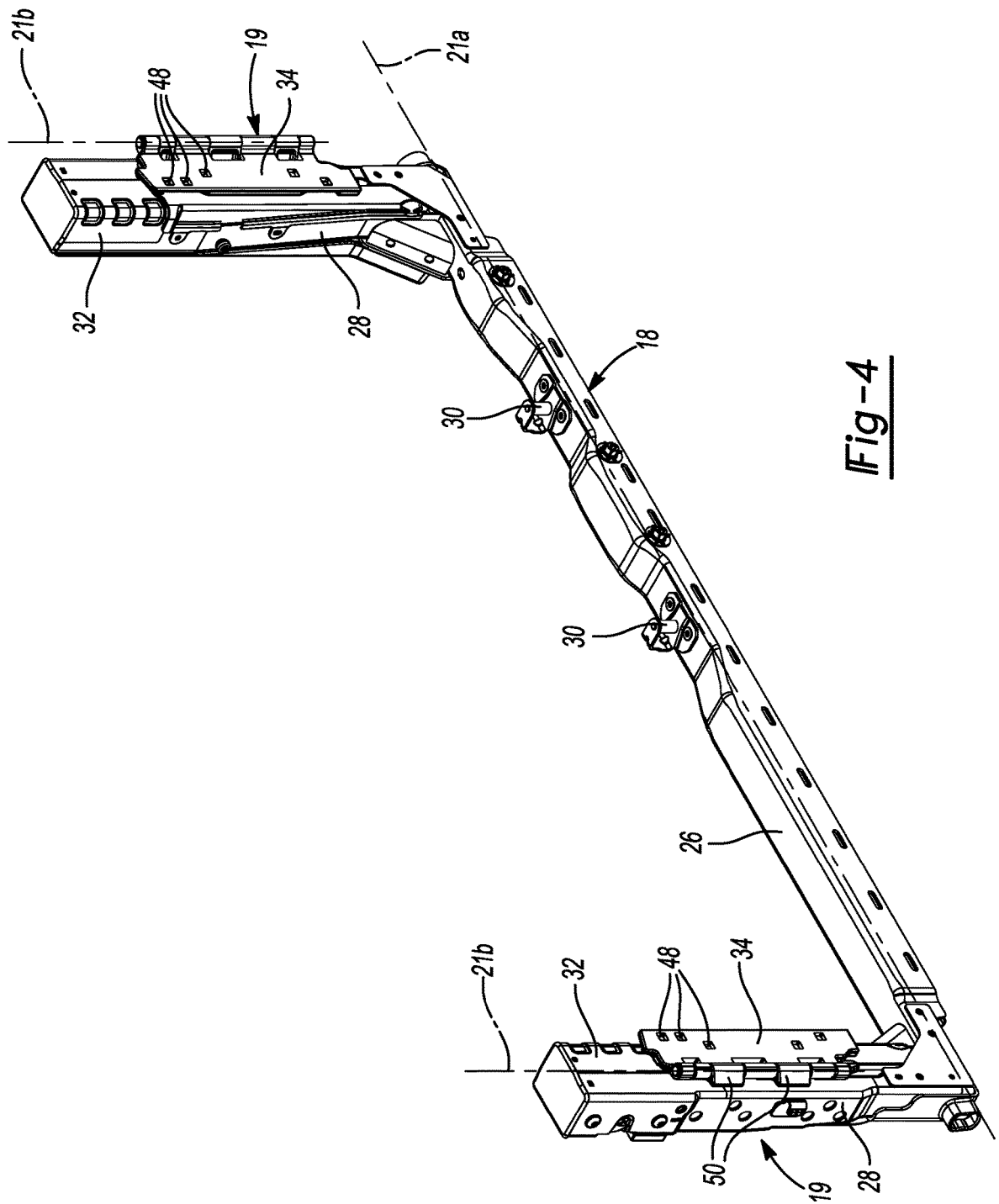
FIG. 4 is a perspective view of a frame of the cargo bed with a pair of hinge assemblies coupled thereto.

As shown in FIG. 4, the frame 18 is U-shaped and includes a horizontal section 26 and a pair of vertical sections 28. The horizontal section 26 is rotatably coupled to the cargo bed 14 and defines the horizontal axis 21a. The horizontal section 26 includes striker pins 30 extending outwardly therefrom. Latch mechanisms (not shown) of the doors 22, 24 are configured to latch onto the striker pins 30. When the latch mechanisms are latched onto the striker pins 30, the doors 22, 24 are prevented from pivoting about the respective vertical axis 21b. When the latch mechanisms are unlatched from the striker pins 30, the doors 22, 24 are allowed to pivot about the respective vertical axis 21b.

Each vertical section 28 is coupled to opposing ends of the horizontal section 26 and includes a latch mechanism 32. Each door 22, 24 is pivotably coupled to a respective vertical section 28 via a respective hinge assembly 19 (FIGS. 1, 3 and 6-10), thereby allowing the door 22, 24 to pivot about the respective vertical axis 21b. The latch mechanism 32 is configured to latch onto the striker pin (not shown) extending outwardly from a respective sidewall 20 of the cargo bed 14. When the latch mechanism 32 is latched onto the striker pin, the door 22, 24 is prevented from pivoting about the horizontal axis 21a. When the latch mechanism 32 is unlatched from the striker pin, the door 22, 24 is allowed to pivot about the horizontal axis 21a.

With reference to FIGS. 1-10, the pair of hinge assemblies 19 couples the doors 22, 24 to respective sidewalls 20 of the cargo bed 14 via the frame 18 such that the doors 22, 24 are allowed to independently pivot about respective vertical axes 21b between the closed position and the vertical open position. As will be described in more detail below, each hinge assembly 19 is hidden from view from behind the cargo bed 14 as the doors 22, 24 pivot about respective vertical axes 21b.

Each hinge assembly 19 includes a first hinge bracket 34, a second hinge bracket 36 and a pair of pins 38. The first hinge bracket 34 is coupled to an inner surface 40 of the door 22, 24 and includes a hinge plate 42 and a plurality of hinge barrels 44. The hinge plate 42 has a planar surface that is coupled to the inner surface 40 of the door 22, 24. The hinge plate 42 also includes a plurality of apertures 48 extending therethrough. Fasteners (not shown) extend through the apertures 48 and through apertures of the door 22, 24, thereby coupling the hinge plate 42 to the inner surface 40 of the door 22, 24. The plurality of hinge barrels 44 extend from a periphery of the hinge plate 42 and are spaced apart from each other.

Figure 8:
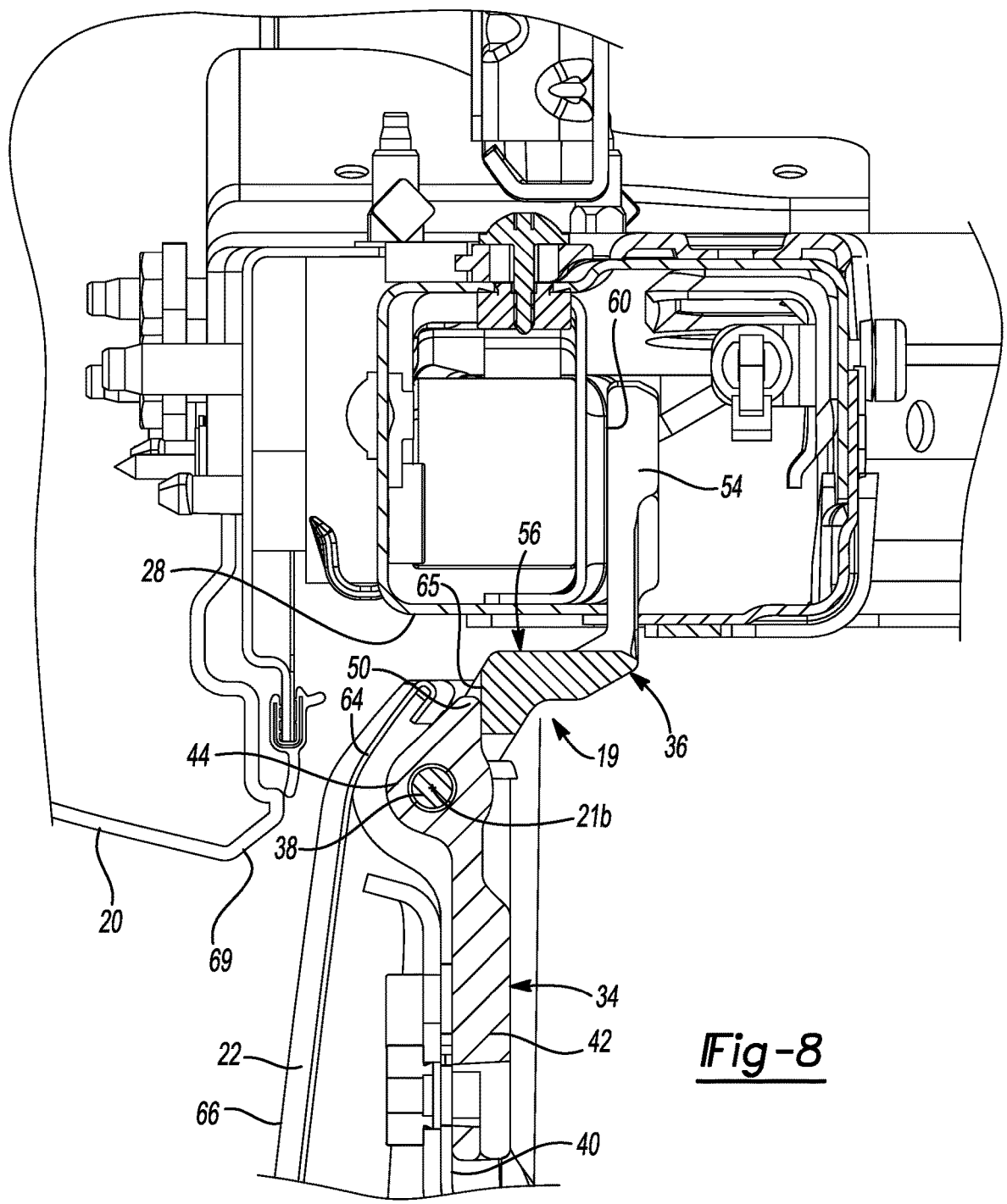
FIG. 8 is a cross-sectional view of the cargo bed and the door of the multi-functional tailgate of FIG. 7 with the door in the vertical open position.

Two or more of the barrels 44 include a tab 50 extending outwardly therefrom. As shown in FIG. 8, each tab 50 is configured to contact the second hinge bracket 36 when the door 22, 24 is pivoted from the closed position to the vertical open position to prevent further opening of the door 22, 24.

The second hinge bracket 36 is coupled to a respective vertical section 28 of the frame 18 at a middle portion of the respective vertical section 28 (the second hinge bracket 36 is positioned below the latch mechanism 32). The second hinge bracket 36 is also positioned adjacent to a respective tail light 52 of the cargo bed 14 and extends substantially a length of the respective tail light 52. The second hinge bracket 36 includes a hinge plate 54, and extension or gooseneck section 56 and a plurality of hinge barrels 58. The hinge plate 54 is coupled to an inside surface 60 of the respective vertical section 28 at a middle portion thereof (the inside surface 60 of each vertical section 28 faces toward each other). In this way, when the door 22, 24 is pivoted to the vertical open position, the load of the door 22, 24 is transferred to the middle portion of the respective vertical section 28, thereby preventing a twisting movement of the respective vertical section 28. The hinge plate 54 also includes a plurality of apertures 62 extending therethrough. Fasteners (not shown) extend through the apertures 62 of the hinge plate 54 and through apertures of the respective vertical section 28, thereby coupling the hinge plate 54 to the frame 18.

Figure 9:
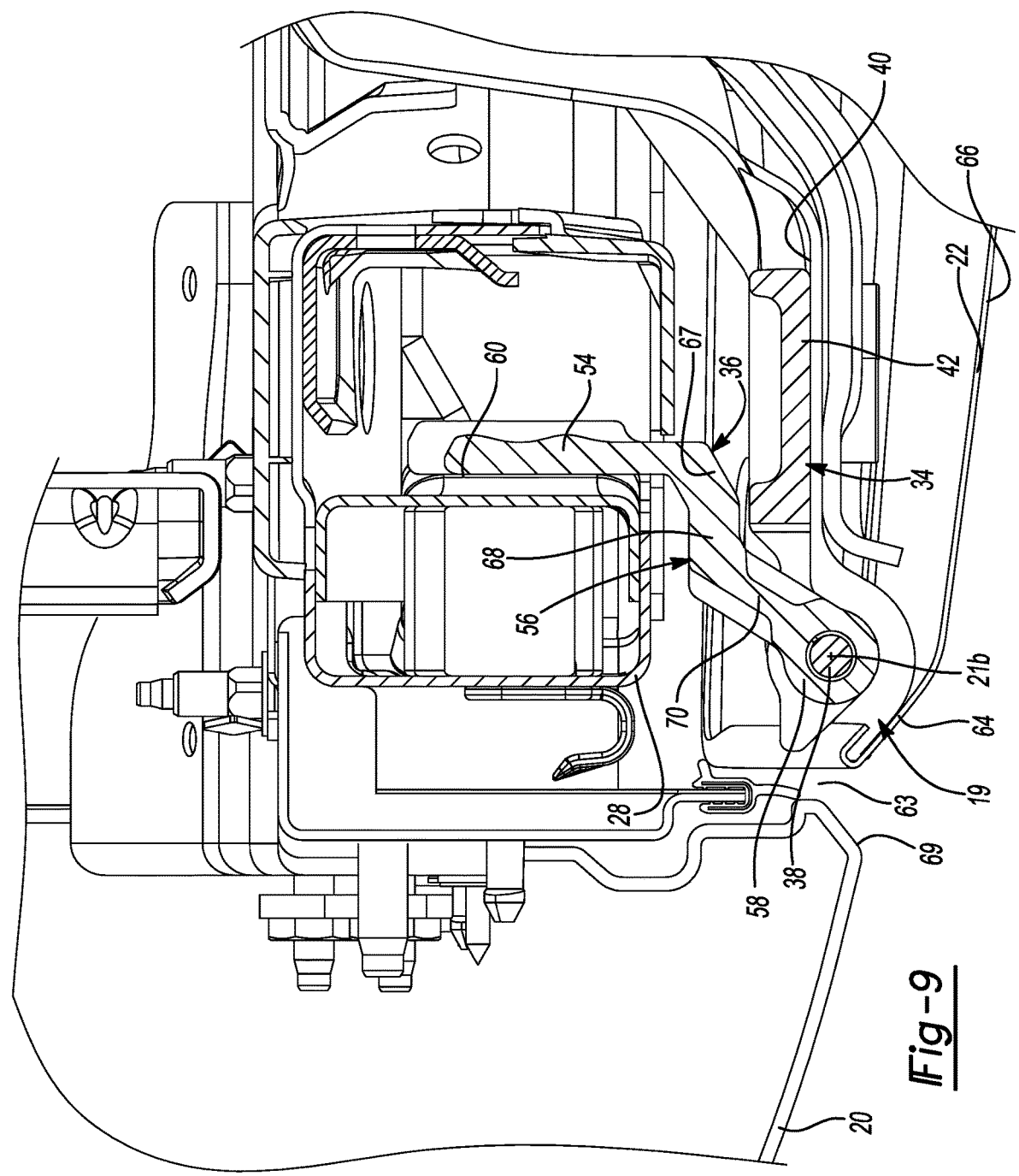
FIG. 9 is a cross-sectional view of the cargo bed and the door of the multi-functional tailgate taken along line 9-9 of FIG. 6 with the door in the closed position.
Figure 10:
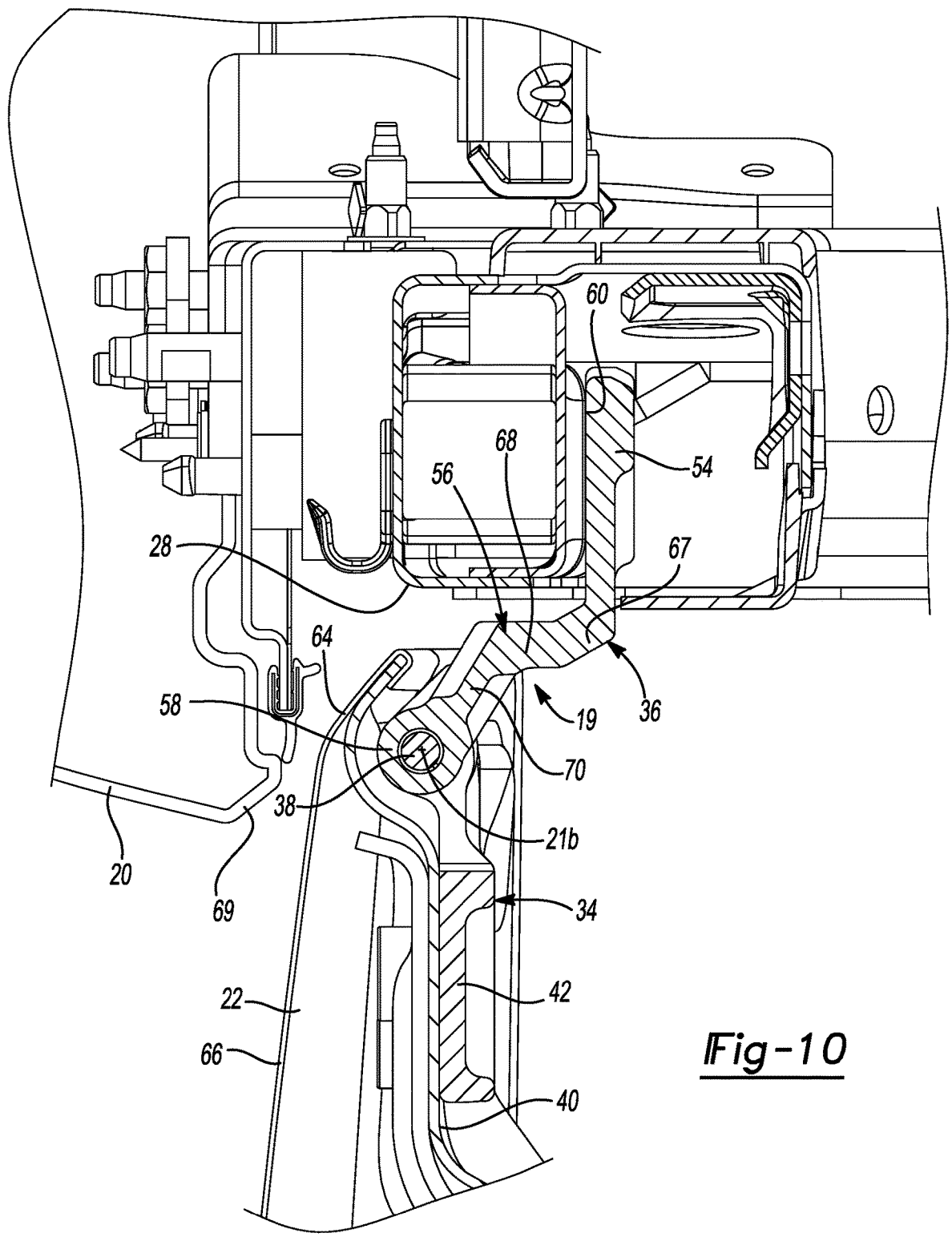
FIG. 10 is a cross-sectional view of the cargo bed and the door of the multi-functional tailgate of FIG. 9 with the door in the vertical open position.

The extension section 56 extends from the hinge plate 54 to the hinge barrels 58 and at least partially wraps around the vertical section 28 of the frame 18. The extension section 56 positions the vertical axis 21b of the door 22, 24 laterally outwardly relative to the mounting location of the hinge plate 54 to the vertical section 28 of the frame 18. The extension section 56 also positions the vertical axis 21b adjacent to an outer corner edge 64 of the door 22, 24 and inwardly relative to an outer panel 66 of the door 22, 24. In this way, a gap 63 between an outer corner edge 69 of the sidewall 20 of the cargo bed 14 and the outer corner edge 64 of the door 22, 24 is minimized (i.e., less than 5 mm) thereby restricting debris from entering between the cargo bed 14 and the door 22, 24. The outer corner edge 64 of the door 22, 24 and the outer corner edge 69 of the sidewall 20 are chamfered. In this way, the door 22, 24 is prevented from contacting the sidewall 20 of the cargo bed 14 when the door 22, 24 is pivoted from the closed position (FIGS. 7 and 9) to the vertical open position (FIGS. 8 and 10).

Figure 5:
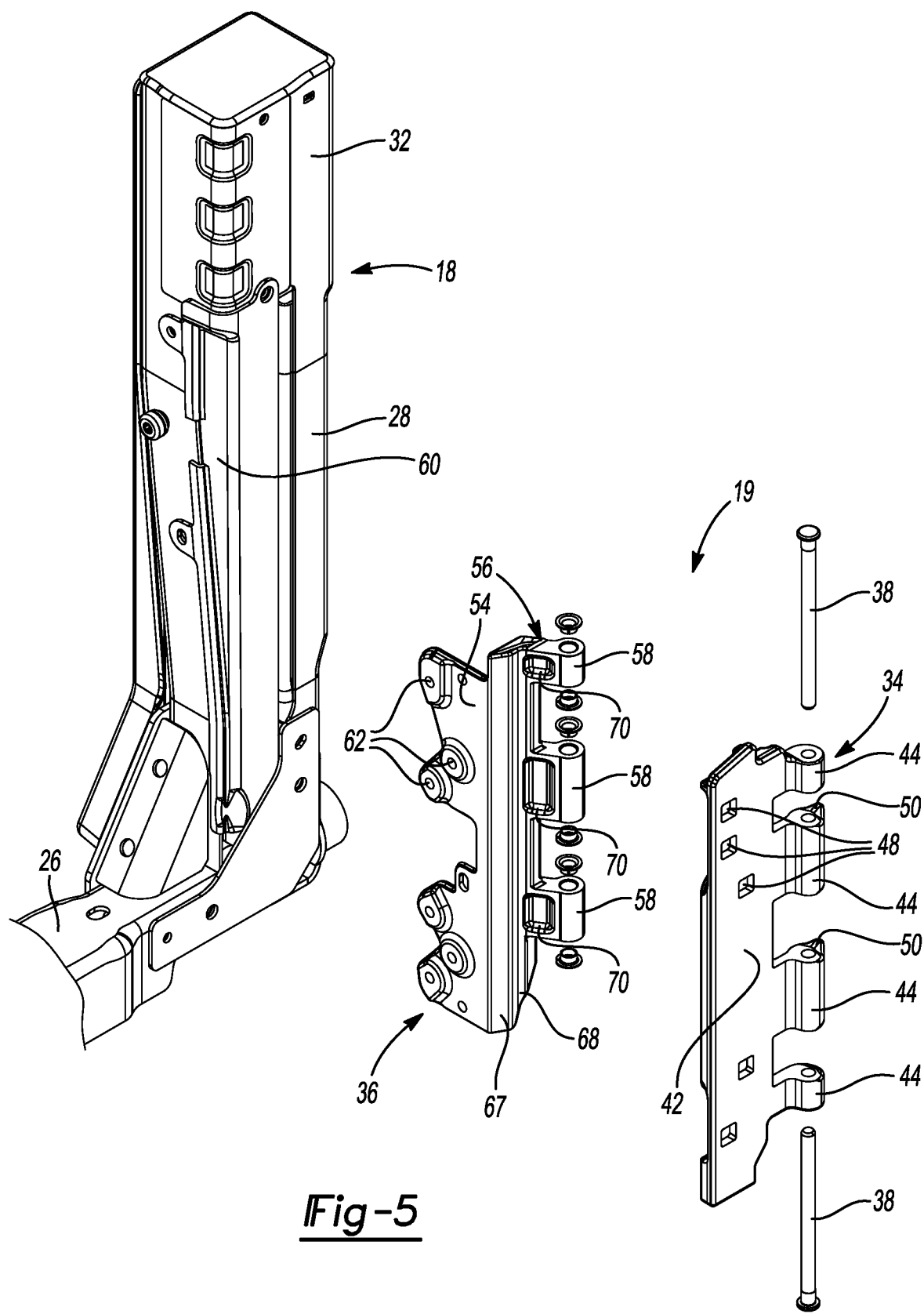
FIG. 5 is an exploded view of one hinge assembly of the pair of hinge assemblies.
Figure 6:
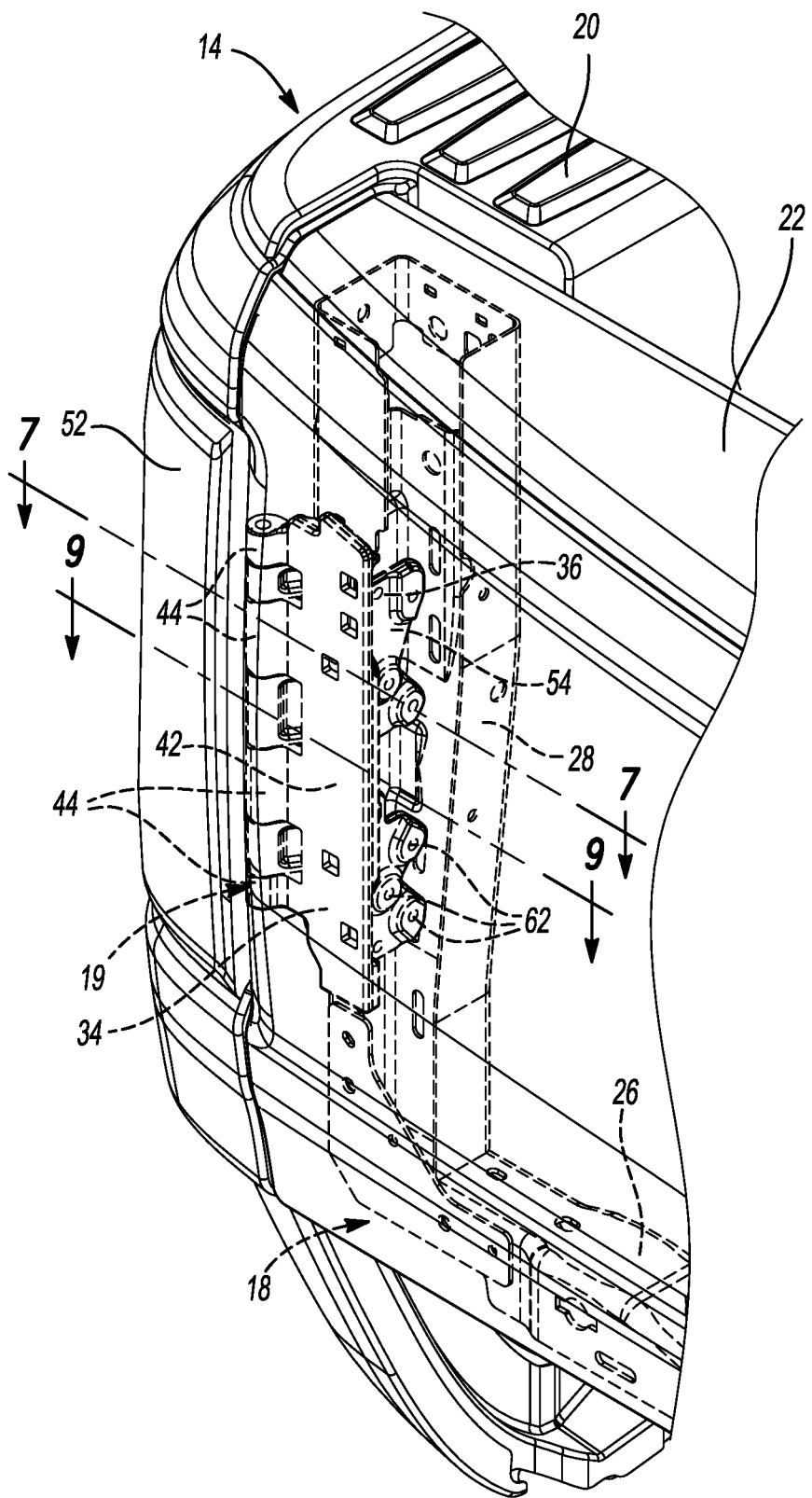
FIG. 6 is a partial perspective view of the cargo bed and a door of the multi-functional tailgate coupled to a hinge assembly.
Figure 7:
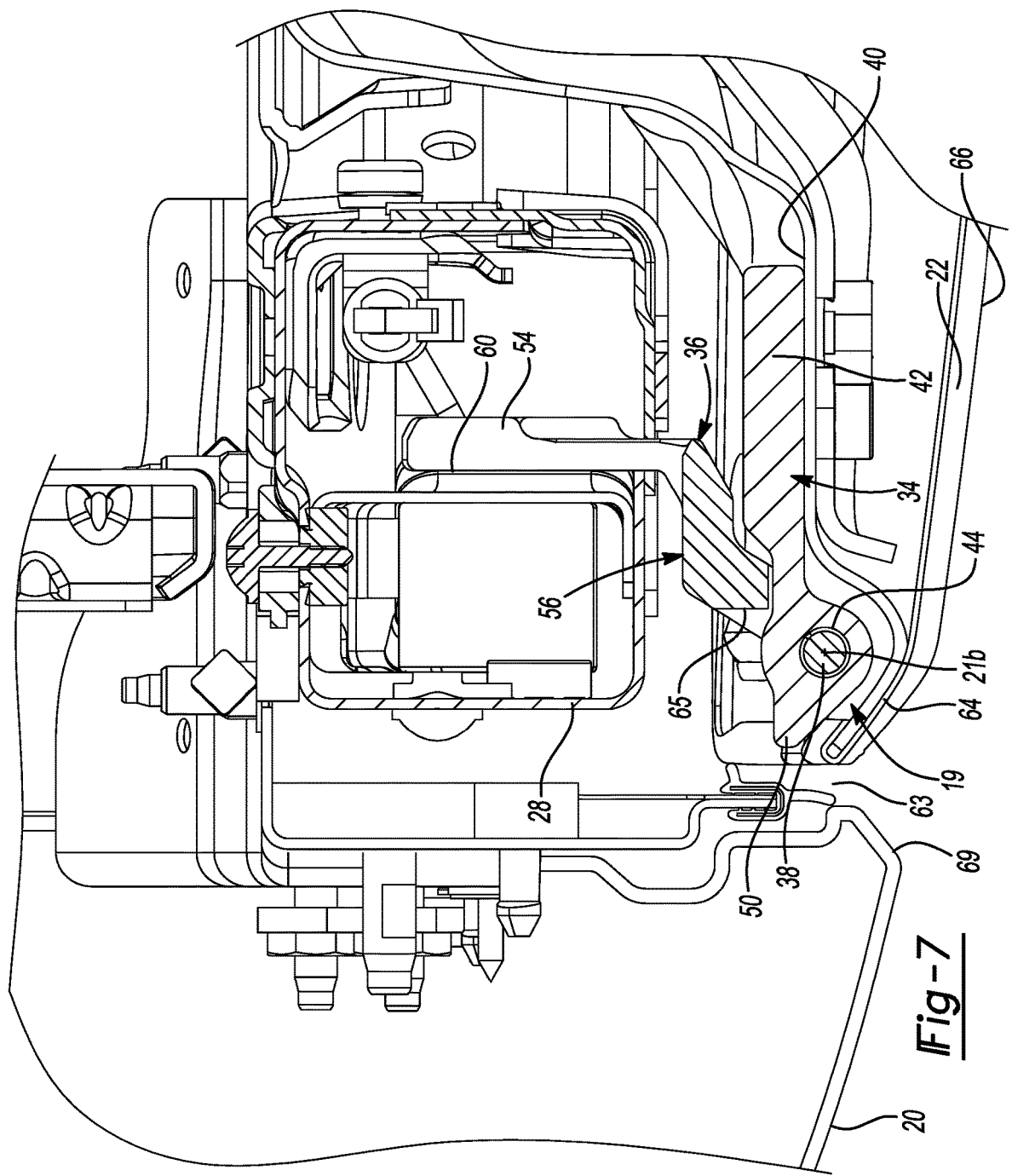
FIG. 7 is a cross-sectional view of the cargo bed and the door of the multi-functional tailgate taken along line 7-7 of FIG. 6 with the door in the closed position.

As shown in FIGS. 7 and 8, the extension section 56 defines surfaces 65 (only one shown in FIGS. 7 and 8) that are configured to abut against respective tabs 50 of the first hinge bracket 34 when the door 22, 24 is in the vertical open position to prevent further opening of the door 22, 24. As shown in FIGS. 5, 9 and 10, the extension section 56 includes a plate portion 67, an intermediate portion 68 and a plurality of hinge barrel portions 70. The plate portion 67 extends generally laterally outwardly (toward a proximate sidewall 20) and rearwardly (toward the outer panel 66 of the door 22, 24) from the hinge plate 54.

The plurality of hinge barrel portions 70 are spaced apart from each other. The plurality of hinge barrel portions 70 also extend generally laterally outwardly (toward the proximate sidewall 20) and rearwardly (toward the outer panel 66 of the door 22, 24) from the intermediate portion 68. Each hinge barrel 58 extends from a respective hinge barrel portion 70 and is received in a space provided between the hinge barrels 44 of the first hinge bracket 34. The pins 38 are received in one or more hinge barrels 44 of the first hinge bracket 34 and one or more hinge barrels 58 of the second hinge bracket 36 to couple the hinge brackets 34, 36 to each other. The pins 38 also define the vertical axis 21b that the door 22, 24 pivots about.

The pair of hinge assemblies 19 of the present disclosure provides the benefit of positioning the vertical axis 21b of the door 22, 24 laterally outwardly relative to the mounting location of the hinge plate 54 to the vertical section 28 of the frame 18. The pair of hinge assemblies 19 also positions the vertical axis 21b adjacent to the outer corner edge 64 of the door 22, 24 and inwardly relative to an outer panel 66 of the door 22, 24. In this way, the gap 63 between the outer corner edge 69 of the sidewall 20 of the cargo bed 14 and the outer corner edge 64 of the door 22, 24 is minimized (i.e., less than 5 mm) thereby restricting debris from entering between the cargo bed 14 and the door 22, 24. The hinge assemblies 19 are also hidden from view from behind the cargo bed 14 when the doors are in the closed position.

What is claimed is:

1. A vehicle comprising:
   a vehicle body;
   a door coupled to the vehicle body and pivotable about a horizontal axis between a closed position and a horizontal open position, the door also pivotable about a vertical axis between the closed position and a vertical open position; and
   a hinge assembly pivotably coupling the door to the vehicle body and including a first hinge, a second hinge and a pivot pin, the first hinge including a first hinge plate and at least one first hinge barrel extending from the first hinge plate, the second hinge including a second hinge plate, an extension section and at least one second hinge barrel extending from the extension section, the pivot pin defining the vertical axis and extending at least partially through the at least one first hinge barrel and the at least one second hinge barrel, wherein the extension section positions the vertical axis laterally outwardly relative to a mounting location of the hinge assembly and the vehicle body, the vertical axis also being positioned inwardly relative to the door.

2. The vehicle of claim 1, wherein the extension section includes a plate portion, an intermediate portion and a hinge-barrel portion, the plate portion extends at an angle from the second hinge plate to the intermediate portion and the hinge-barrel portion extends at an angle from the intermediate portion to the hinge-barrel portion.

3. The vehicle of claim 2, wherein the extension section includes a stop surface, and wherein the first hinge is configured to contact the stop surface when the door is in the vertical open position to prevent further opening of the door.

4. The vehicle of claim 1, wherein the extension section includes a plate portion, an intermediate portion and a hinge-barrel portion, and wherein the plate portion extends laterally outwardly and rearwardly from the second hinge plate and the hinge-barrel portion extends laterally outwardly and rearwardly from the intermediate portion.

5. The vehicle of claim 1, wherein the extension section positions the vertical axis adjacent to an outer corner edge of the door.

6. The vehicle of claim 1, further comprising a frame coupled to the vehicle body, and wherein the second hinge plate is coupled to the frame.

7. The vehicle of claim 1, wherein the at least one first hinge barrel includes a tab extending therefrom and the extension section includes a stop surface, and wherein the tab is configured to contact the stop surface when the door is in the vertical open position to prevent further opening of the door.

8. The vehicle of claim 1, wherein an outer corner edge of the door is chamfered and an outer corner edge of the vehicle body opposing the door is chamfered.

9. The vehicle of claim 8, wherein the at least one first hinge barrel and the at least one second hinge barrel is positioned adjacent the outer corner edge of the door.

10. The vehicle of claim 8, wherein a gap exists between the outer corner edge of the vehicle body and the outer corner edge of the door, and wherein the gap is equal to or less than 5 mm.

11. The vehicle of claim 1, further comprising a frame coupled to the vehicle body, and wherein the first hinge is coupled to the door and the second hinge is coupled to a vertical section of the frame at a middle portion of the vertical section.

12. The vehicle of claim 11, wherein the extension section at least partially wraps around the vertical section of the frame.

* * * * *